United States Patent
Livet

(10) Patent No.: US 8,010,243 B2
(45) Date of Patent: Aug. 30, 2011

(54) METHOD AND DEVICE FOR LIGHTENING LOADS ON THE WING SYSTEM OF AN AIRCRAFT IN ROLL MOTION

(75) Inventor: Tania Livet, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 913 days.

(21) Appl. No.: 11/994,223

(22) PCT Filed: Jul. 6, 2006

(86) PCT No.: PCT/EP2006/063974
§ 371 (c)(1),
(2), (4) Date: Dec. 28, 2007

(87) PCT Pub. No.: WO2007/006725
PCT Pub. Date: Jan. 18, 2007

(65) Prior Publication Data
US 2008/0203237 A1    Aug. 28, 2008

(30) Foreign Application Priority Data
Jul. 8, 2005    (FR) ...................................... 05 52110

(51) Int. Cl.
*B64C 13/16*    (2006.01)
*G06F 19/00*    (2006.01)

(52) U.S. Cl. ............ 701/8; 701/124; 244/76 R; 340/945

(58) Field of Classification Search .............. 701/8, 124; 244/76 R, 76 C, 213; 340/945
See application file for complete search history.

(56) References Cited

U.S. PATENT DOCUMENTS

| | | | |
|---|---|---|---|
| 4,479,620 A * | 10/1984 | Rogers et al. ................. 244/195 |
| 4,638,229 A | 1/1987 | Birkedahl | |
| 4,796,192 A | 1/1989 | Lewis | |
| 5,186,416 A * | 2/1993 | Fabre et al. .................... 244/191 |
| 5,375,794 A | 12/1994 | Bleeg | |
| 5,669,582 A * | 9/1997 | Bryant et al. ................ 244/76 C |
| 5,850,615 A * | 12/1998 | Osder ............................. 701/4 |
| 2005/0192718 A1 | 9/2005 | Delaplace et al. | |

FOREIGN PATENT DOCUMENTS
FR    2 864 032 A1    6/2005

\* cited by examiner

*Primary Examiner* — Tan Q Nguyen
(74) *Attorney, Agent, or Firm* — Oblon, Spivak, McClelland, Maier & Neustadt, L.L.P.

(57) ABSTRACT

A device used in an aircraft with an electrical flight control system to reduce load applied to the wing during a lateral roll maneuver, by comparing a roll control with a threshold, and filtering a control. As a result of this action on the roll control, resulting load increases on the wing can be anticipated and reduced. Loads can thus remain below a maximum design value for the wing if the applied roll control is too high for planned use of the aircraft, therefore limiting overdesign of the wing.

14 Claims, 2 Drawing Sheets

METHOD AND DEVICE FOR LIGHTENING LOADS ON THE WING SYSTEM OF AN AIRCRAFT IN ROLL MOTION

TECHNICAL FIELD

The invention relates to the reduction of loads on the structure of an aircraft. In particular, the invention relates to a method of limiting loads on the wing during lateral roll maneuvers.

The invention also relates to a device for anticipating the response of an aircraft to a maneuver order, particular in roll, so as to reduce loads on the structure, particularly at the wing.

PRIOR ART

The different parts of an aircraft structure are designed to resist specific loads without the occurrence of permanent deformations. These loads are generated during all aircraft maneuvers; in particular, they can be greater than normal loads when the aircraft encounters severe turbulence, during piloting errors, during unusual maneuvers, or under exceptional external conditions. These overloads are normally at least partly taken into account in the modeling and sizing of the different elements of the aircraft structure, to determine allowable loads with no risk.

Furthermore, particularly for warplanes, the range of maneuvers to be carried out is usually greater than under normal conditions: low altitude flight, terrain following, evasive actions, etc. Thus, it has been found that the roll rate should be considered as a parameter that influences the design of the wing of a warplane. The maneuvers mentioned above require a roll rate twice as high as the roll rate for a civil transport aircraft; the load applied to the structure, and particularly the bending moment at the wing root, are then significantly greater than for a normal flight.

Moreover, the increasing use of winglets on aircraft in which they weren't used in the past can also create loads on wings in classical roll maneuvers. Therefore, this roll rate parameter should also be considered for the design of civil aircraft structures, particular for the wing root.

Until now, the overload characteristics compared with the design have been determined in a posterior tests. Thus, overloads are normally detected by measuring a parameter, particularly the speed: for different speeds determined using load models specific to each zone of the aircraft, an alarm is triggered when the allowable speed is exceeded, for example by four knots. An improvement to this overload detection is described in patent application FR 2864032, in which the vertical load factor as well as the aircraft speed is taken into account to determine an overload at a structural part of the aircraft.

Nevertheless, these methods are only effective after the event generating the potential overload has occurred; they simply signal the need to do a maintenance inspection of the aircraft to check the integrity of the structures after this abnormal load.

One solution to take account of the different parameters and to limit overload alarms is to overdesign the wing, for example considering the bending moment generated by an exception roll rate. However, the direct consequence of this solution is an overload on the wing and therefore an increase in the aircraft weight, which will reduce its performances.

PRESENTATION OF THE INVENTION

The invention aims to overcome existing problems with the design of an aircraft wing as a function of its operating conditions.

More generally, the invention is intended to reduce some loads during provoked roll, and therefore to avoid overdesign of the wing, taking them into account for lateral roll maneuvers.

Thus, one of the aspects of the invention relates to a process to reduce loads caused by a control parameter, and particular the roll rate. Firstly, the parameter is compared with a threshold value that may for example be equal to a proportion, for example 70%, of the command generating the maximum allowable load or the maximum allowable controlled roll rate. When the parameter is less than the threshold, the applied control order corresponds to this parameter; it may be identical to it or it may be filtered by a lowpass filter depending on the reactivity required at the beginning of the maneuver. As soon as the parameter exceeds the threshold, the difference if filtered by a lowpass filter and is added to the control order corresponding to the threshold value. The control is thus attenuated, anticipating an overload above the maximum allowable load. Preferably, if the control order is determined by filtering the parameter up to the threshold value, this filtering is done with a time constant lower than the time constant of the filter used for difference.

According to another aspect, the invention relates to a device adapted for such a process. The device comprises means of determining a control parameter. Advantageously, these means are associated with a control system for applying a control order, such as a roll order, from a device such as for example an aircraft stick to one or more control surfaces such as a spoiler or an aircraft aileron. The device also uses means of calculating the difference between the determined parameter and a threshold value. The device is provided with a first lowpass filter to filter this difference if it is positive; it may be provided with a second lowpass filter to filter either the residual threshold value, or the control parameter if the above mentioned difference is negative. The device comprises means of determining the control order to be applied, which corresponds to the sum of the previous values.

BRIEF DESCRIPTION OF THE DRAWINGS

The characteristics and advantages of the invention will be better understood after reading the following description with reference to the appended drawings given for illustrative purposes without being in any way limitative.

DETAILED PRESENTATION OF PARTICULAR EMBODIMENTS

The invention is applicable to any aircraft with a system of electric flight controls, particularly with a functional link between the device used to control roll in an aircraft and the roll control surfaces. Normally, and preferably, the roll control device is the aircraft stick and the control surfaces comprise the ailerons and/or the air brake located on the wing, called the <<spoiler>> for this roll generation function.

It has been found that the maximum load peak on the wing occurs at a particular instant during a roll maneuver, namely when the aircraft response to the control given by the pilot through the stick is approximately equal to a given percentage of the maximum control, which corresponds to the control generating the maximum load peak for which the structure is designed. For a warplane, this maximum load peak can occur at between 70% and 100% of the maximum applied roll rate control.

Knowing the aircraft response to a roll control, it thus becomes possible to anticipate an overload and to take action on the transmitted control at the moment at which the load applied to the wing becomes equal to the maximum load for which the wing was designed, or slightly before the design load is exceeded. Admittedly, this action will slightly degrade aircraft performances but it limits the load on the wing to be less than or equal to the maximum allowable load, which avoids internal damage to the structure and necessary maintenance operations.

Figure 1:
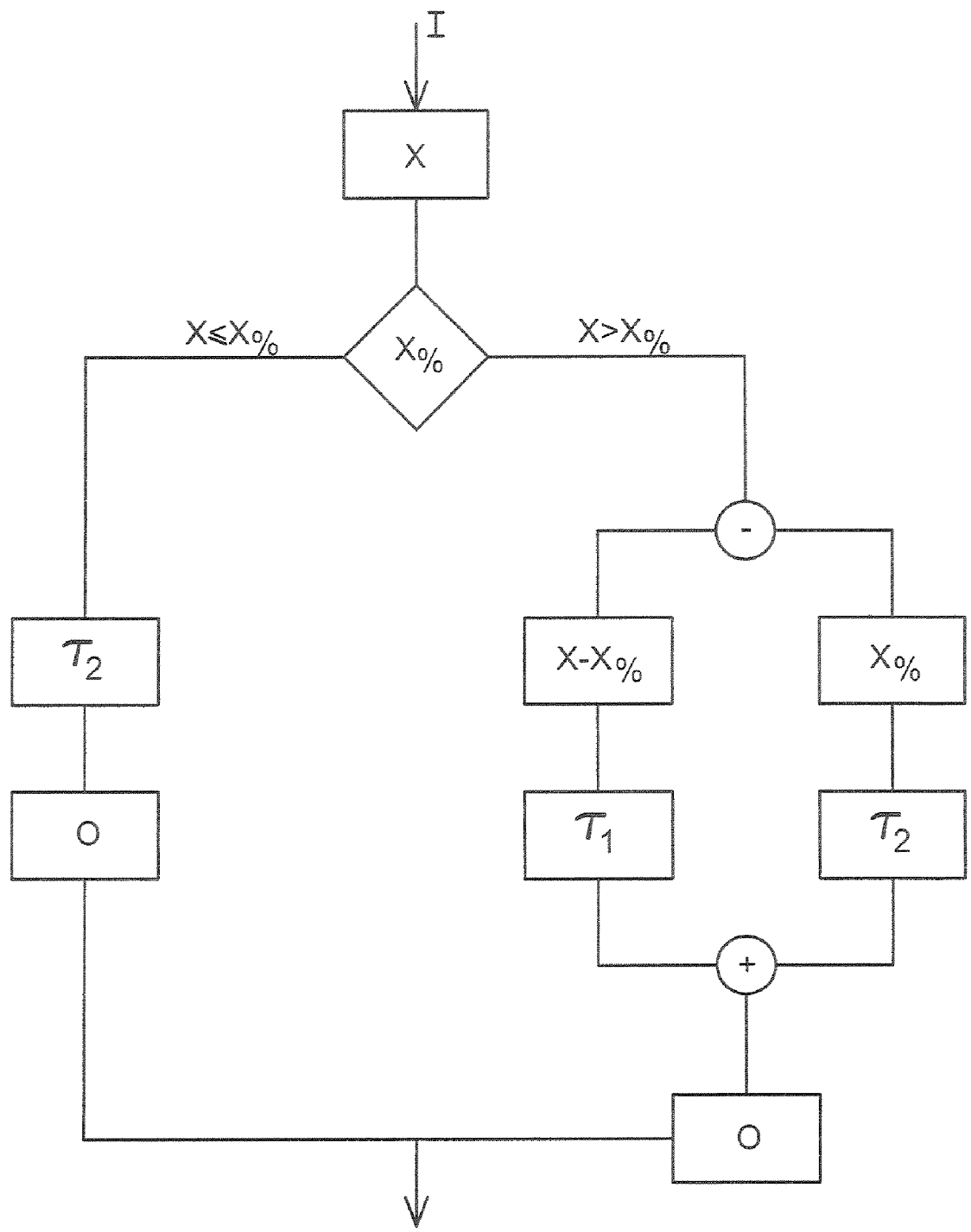
FIG. 1 represents a functional diagram of a method according to the invention.
Figure 2:
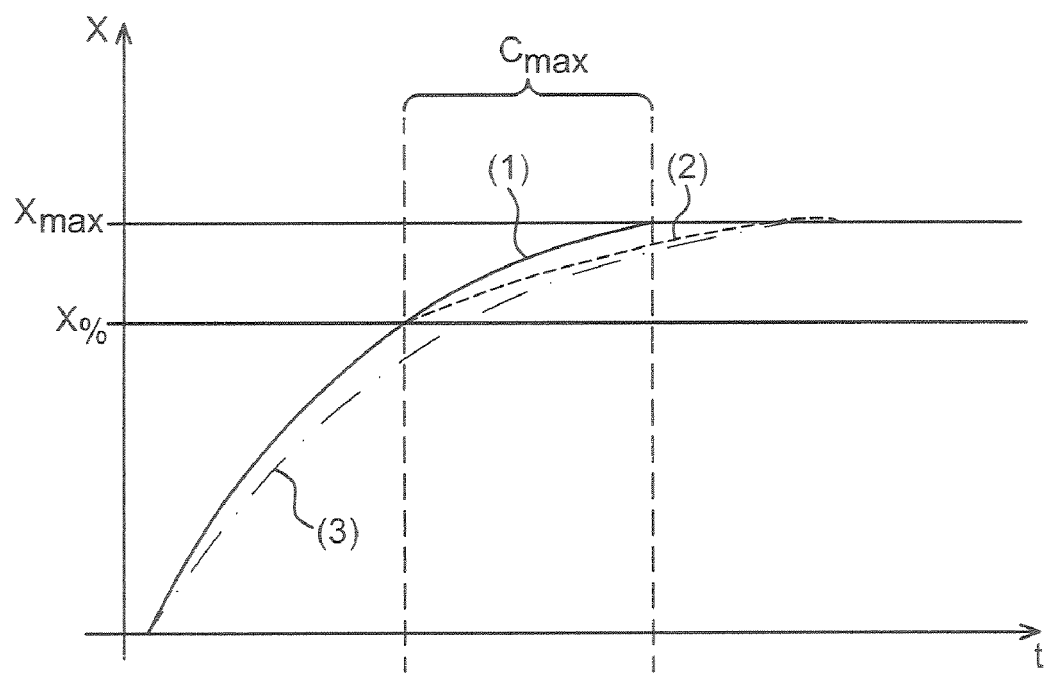
FIG. 2 diagrammatically illustrates the loads applied by a roll control as a function of time, in a usual case (1) and according to two embodiments of the invention (2, 3).

Thus, as illustrated on FIGS. 1 and 2, the roll control X applied by the aircraft roll control device is measured by means of a device coupled to the flight control system. This determination is continuous or is made at regular intervals, and for example is between 10 ms and 50 ms.

Furthermore, the maximum roll control (limit $X_{max}$ on FIG. 2) is usually fixed by performance constraints in the aircraft specification. However, the load C applied to the wing reaches its maximum value or exceeds a maximum load $C_{max}$ that can be applied to it without risk of damage, at about this value $X_{max}$.

The roll control is compared with a threshold $X_{o\%}$, either continuously or preferably at a frequency of the order of 10 to 50 ms. This threshold is predefined as a function of the aircraft, the planned use (particularly civil or military), . . . , to make the load reduction method active as soon as it is recommended that the applied loads should be reduced. Normally, this will be at a percentage of the limit $X_{max}$, for example 70% on a warplane.

As long as the roll control X is less than or equal to the threshold $X_{o\%}$, the control X may be applied because no overload is expected on the wing.

When the roll control X becomes greater than the threshold $X_{o\%}$ according to the invention, the control is attenuated. In particular, the difference between the control X and the threshold $X_{o\%}$ is calculated, and the result is filtered by a first lowpass filter with constant $\tau_1$. The control order O applied to the roll control surfaces is then equal to the sum between this filtered difference and the control corresponding to the threshold value $X_{o\%}$. The difference from a classical unfiltered control X illustrated on curve (1) in FIG. 2, is that there is thus an attenuation of the order actually applied to the structure, and the maximum overload $C_{max}$ is anticipated due to the action on the control X sent at the time that the load C applied to the wing exceeds the maximum load $C_{max}$, or slightly earlier: see curve (2).

Furthermore, and as illustrated on curve (3), the overload can also be anticipated and the roll control X can be filtered at any time. Thus, even when the parameter does not reach the threshold $X_{o\%}$, the roll control corresponds to the parameter X filtered by a lowpass filter with a second time constant $\tau_2$: thus, the aircraft response is anticipated and the load on the wing is retarded. For performance requirements, in this case it is advantageous if the second time constant is less than the first constant: $\tau_1 \geq \tau_2$.

The choice of control alteration parameters, in other words $X_{o\%}$, $\tau_1$, $\tau_2$, is optimized to respect the aircraft performance specification. For example, in the case of a civil transport aircraft (for example illustrated by curve (3) in FIG. 2), there is no need for the aircraft response to a roll control given by the pilot to follow the control strictly, and the lowpass filter can have a non-zero time constant $\tau_2$. For example, for an aircraft for which the performances can tolerate a short delay beyond the delay in acquisition of the order by the control surfaces at the beginning of the control, the threshold value $X_{o\%}$ may be of the order of 70%, where $\tau_1=1.2$ s and $\tau_2=0.1$ s.

Figure 3:
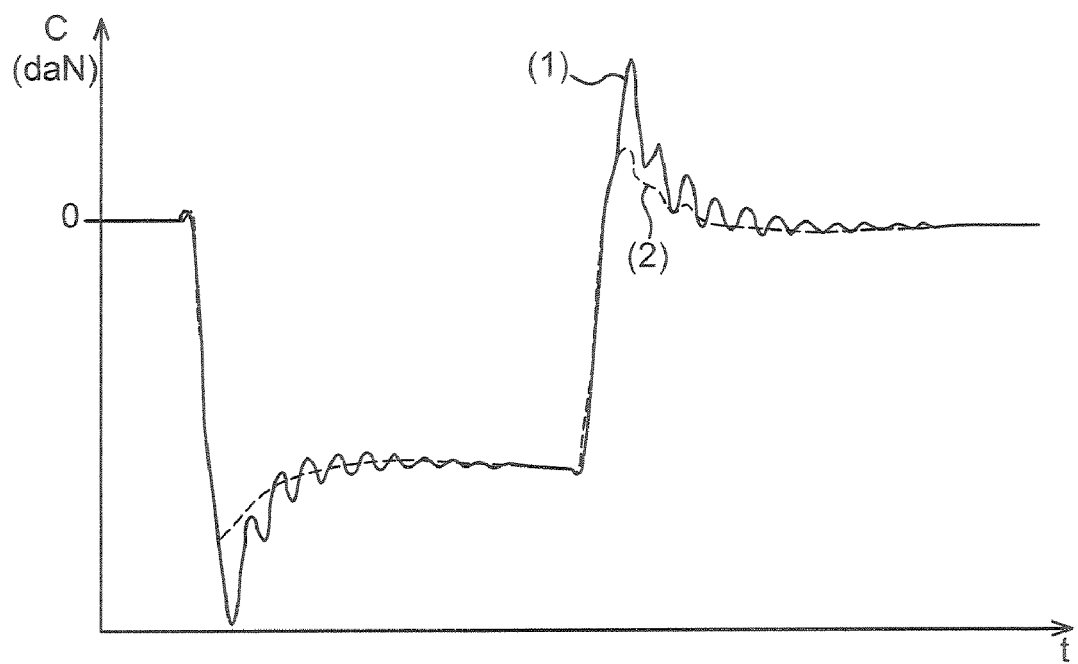
FIG. 3 shows the variation of the bending moment applied on a wing with time during a classical lateral roll maneuver on an aircraft, in the usual case (1) and with filtering according to the invention (2).

On the other hand, for a military transport plane (for example illustrated on curve (2)) requiring a response very shortly after the control, it is preferable to choose $\tau_2$ to be equal to zero, which is equivalent to eliminating the corresponding lowpass filter so that the aircraft will respond immediately to the pilot's roll control, and that there is no delay in addition to the piloting law at the beginning of the maneuver. The limitation only occurs when the roll control X exceeds the threshold $X_{o\%}$. Thus, for an aircraft for which performances are optimum at the beginning of the control, the values can thus become $X_{o\%}=0.7 \cdot X_{max}$, $\tau_2=0$, $\tau_1=0.6$ s, which can reduce the bending moment applied on the wing by the order of 17%, corresponding to a non-negligible mass gain. For example, the result of the method according to the invention with these values ($X_{o\%}=70\%$, $\tau_2=0$, $\tau_1=0.6$ s) is shown on curve (2) in FIG. 3 for a military aircraft during a roll control at $X_{max}$, using curve (1) as reference illustrating normal loads for the same procedure.

In the same way as the performance at the beginning of the maneuver depends on the time constant $\tau_2$, $\tau_1$ can be varied to improve the percentage load reduction, to the detriment of maneuverability of the aircraft. In fact, the different parameters are closely related to the settings of piloting laws defined in aircraft computers with electric flight controls and planned usage criteria; an acceptable compromise between load reduction and maneuverability can be obtained.

Thus, the invention proposes to reduce lateral loads during roll maneuvers by introducing a control law on orders applied to the stick by integrating a specific load reduction relation between the roll control device and servocontrols of lateral piloting relations, so that savings of the structural mass can be achieved by reducing the generated load.

Although described here for a reduction in the moment applied at the wing root during a roll maneuver applied to an aircraft control device, it is clear that the method is applicable to any other piloting device if it is capable of reducing loads applied to a component of the aircraft.

The invention claimed is:

1. A method for reducing loads on a structural element of an aircraft due to a control parameter comprising:
   comparing the parameter with a threshold value of the parameter;
   when the parameter is less than or equal to the threshold value, applying a control value to the device corresponding to the control parameter;
   when the parameter exceeds a threshold value:
      filtering the difference between the parameter and the threshold value using a low-pass filter with a first time constant, and
      applying a control order to the device corresponding to the sum of the filtered difference and a control value corresponding to the threshold value.

2. A method according to claim 1, in which the control order corresponds to the parameter or the threshold value filtered by a low-pass filter with a second time constant.

3. A method according to claim 2, in which the second time constant is less than the first constant.

4. A method according to claim 2, wherein the aircraft is a civilian aircraft and the second time constant is non-zero.

5. A method according to claim 4, wherein the second time constant is 1.2 seconds and the first time constant is 0.1 seconds.

6. A method according to claim 2, wherein the aircraft is a military aircraft and the second time constant is zero.

7. A method according to claim 6, wherein the first time constant is 0.6 seconds.

8. A method according to claim 1, in which the control parameter is roll rate.

9. A method according to claim 1, in which the threshold value is less than 100% of the control corresponding to a allowable maximum load.

10. A method according to claim 1, wherein comparing is performed continuously.

11. A device for reducing load on a structural element of an aircraft due to a control, comprising:
- an electrical control system configured to determine a control parameter;
- an aircraft computer configured to calculate the difference between the control parameter and a threshold value of the control parameter; and
- a first low-pass filter to filter the calculated difference if the difference is positive;
- wherein the aircraft computer is configured to determine a control order that corresponds to the control parameter if the calculated difference is negative, and the aircraft computer is configured to determine the control order that corresponds to a sum of the filtered difference and a control value corresponding to the threshold value if the difference is positive.

12. A device according to claim 11, further comprising a second low-pass filter, to determine the control order corresponding to a value by filtering.

13. A device according to claim 11, further comprising a control system to apply the control order to a control surface.

14. A device according to claim 11, wherein the electrical control system is connected to a control device, or an aircraft stick, and to a control surface, or an aircraft aileron.

* * * * *